US006922661B2

(12) United States Patent
Carrillo

(10) Patent No.: US 6,922,661 B2
(45) Date of Patent: Jul. 26, 2005

(54) PROCESS FOR INITIALIZING AND UPDATING THE TOPOLOGY OF A HIGH-VOLTAGE OR MEDIUM-VOLTAGE ELECTRICAL POWER STATION

(75) Inventor: Jean-Jacques Carrillo, Montauban (FR)

(73) Assignee: Alstom, Paris (FR)

( * ) Notice: Subject to any disclaimer, the term of this patent is extended or adjusted under 35 U.S.C. 154(b) by 629 days.

(21) Appl. No.: 09/987,994

(22) Filed: Nov. 16, 2001

(65) Prior Publication Data

US 2002/0091503 A1 Jul. 11, 2002

(30) Foreign Application Priority Data

Nov. 17, 2000 (FR) ............................................ 00 14851

(51) Int. Cl.[7] ........................ G06F 17/10; G06F 17/50; G06F 7/60
(52) U.S. Cl. ............................... 703/2; 703/18; 716/2; 716/3
(58) Field of Search .......................... 703/2, 18; 716/2, 716/3

(56) References Cited

U.S. PATENT DOCUMENTS

| | | | | |
|---|---|---|---|---|
| 5,331,579 A | * | 7/1994 | Maguire et al. ............... | 703/2 |
| 5,732,192 A | * | 3/1998 | Malin et al. .................... | 703/2 |
| 5,742,795 A | | 4/1998 | Küssel | |
| 5,781,764 A | * | 7/1998 | Degeneff et al. ............... | 703/2 |
| 6,023,571 A | * | 2/2000 | Matsumoto et al. ........... | 703/2 |
| 6,105,139 A | * | 8/2000 | Dey et al. .................... | 713/300 |
| 6,301,686 B1 | * | 10/2001 | Kikuchi et al. ................ | 716/2 |
| 6,336,205 B1 | * | 1/2002 | Kurokawa et al. ............. | 716/2 |
| 6,396,814 B1 | * | 5/2002 | Iwamura et al. ............ | 370/256 |
| 6,608,635 B1 | * | 8/2003 | Mumm ........................ | 345/736 |

OTHER PUBLICATIONS

Medlicherla et al., Transmission Station Reliability Evaluation, IEEE Transactions on Power Systems, 1994.*
Teo et al., Visually Integrated Modeling for Distribution Network Operation and Planning, IEEE Jun. 2000.*
Kawakami et al., A Real Time Operation Power System Simulator, IEEE 2000.*
Paynter et al., Two–Port Canonical Bond Graph Models of Lossy Power Transduction, IEEE 1997.*
Yu, D.C. et al., "Facilitating Engineering Analysis Via A Graphical Database", Rural Electric Power Conference, Nashville, Apr. 30–May 2, 1995, New York, IEEE, US, vol. CONF. 39, Apr. 30 1995, pp. C5–1–C5–7, XP000556944.
Yehsakul, P.D. et al., A Topology–Based Algorithm For Tracking Network Connectivity, IEEE Transactions on Power Systems, IEEE Inc., New York, US, vol. 10, No. 1, Feb. 1 1995, pp. 339–346, XP000513251.

* cited by examiner

*Primary Examiner*—W Thomson
(74) *Attorney, Agent, or Firm*—Sughrue Mion, PLLC

(57) ABSTRACT

The process is intended to optimize the operation of a digital protection system for protecting sets of busbars in the power station and uses a basic schematic of the electrical configuration of the power station obtained from information on the type of components used in the power station, and on the possible connections and accesses to said components. The information is assigned to management units of the digital protection system, said management units comprising peripheral measurement units and at least one centralization unit. A topological compilation process is implemented to provide a compiled schematic topology, and to provide a compiled assignment topology of the components in the power station and of their connections to the management units. A partial graph, whose structure depends on the type of information searched for and the status of each component of the power station, is obtained for each peripheral unit. A complete graph is then computed in one or more centralization units by algorithms which superpose partial graphs.

14 Claims, 5 Drawing Sheets

Set of connections

Connected areas graph

Adjacent circuit-breakers graph

Circuit as seen from a component

Reducing connections

Set of connections

PROCESS FOR INITIALIZING AND UPDATING THE TOPOLOGY OF A HIGH-VOLTAGE OR MEDIUM-VOLTAGE ELECTRICAL POWER STATION

The invention relates to a process for initializing and updating topology, the process being intended to optimize the operation of a digital protection system for protecting sets of busbars in a high-voltage or medium-voltage electrical power station. The protection system is intended primarily to detect short circuits in a set of busbars and to detect failure of a component of the network such as a disconnector, a circuit-breaker, a transformer or any other component in the overall schematic of the set of busbars. It is further intended to validate commands affecting the status of the components, for example.

BACKGROUND OF THE INVENTION

Generally speaking, a digital busbar-protection system requires as input information a basic schematic corresponding to the configuration of the set of busbars in the electrical power station that are managed by the system. Recognizing the basic schematic obviously requires a knowledge of the components of the network and information to be available on their configuration and status (for example whether they are open or closed). In the most conventional systems, such recognition is the task of an operator who holds a library of schematics constituting a limited number of predefined electrical configurations, generally less than one thousand configurations. Thus these conventional systems cannot identify all possible schematics or all their particular features, because the characteristics of the actual schematic must necessarily have been catalogued in order to be retrieved. Also, the operator's task is then time-consuming because the operator must recognize if the basic schematic of the network is one of the catalogued schematics available to him.

OBJECTS AND SUMMARY OF THE INVENTION

To remedy the above drawbacks, the present invention firstly proposes optimizing the operation of a digital busbar-protection system in a power station so that the system can perform automatic schematic recognition. The optimized system systematically recognizes any basic schematic of a power station of an electrical distribution network from an infinite range of possible schematics, and considerably simplifies the operator's task. The operator no longer needs to look up the reference of a predefined schematic and enter a first topological level constituted by the complete schematic of the set of busbars and its components via a man-machine interface (MMI). The optimized system generates the necessary topological information from the basic schematic, that information consisting of the possible access paths to each component and the connections between components according to their status.

It is noted that a process for initializing and updating the topology of a distribution network is known from patent document U.S. Pat. No. 5,742,795, the process being particularly intended for extended networks and enabling the topology to be initialized or updated in an acceptable time period. The process uses vector and matrix methods, the topology data of measured networks being presented in the form of a terminal adjacent matrix transforming the matrix to an upper triangular matrix.

The Applicant believes that the methods described in that document are not particularly advantageous when it relates to processing a relatively limited sub-portion of an electrical distribution network, e.g. a transformer station and/or an electricity distribution station.

Thus, the present invention secondly proposes that optimization of the operation of a protection system for protecting set of busbars in a power station makes use of methods that are essentially based on topological compilation algorithms and on graph processing algorithms. Also, the operator can enter via the MMI of a second topological level, referred to as the topological level of assignment and consisting of information on the assignment of components to management units of the protection system described in more detail below. Entry of the schematic topology and the assignment topology is managed by a distributed topology program that manages the files of the list of components and of the list of connections for each management unit of the protection system. In each management unit, the program uses topological compilation algorithms and algorithms for graph processing by operational searching to calculate the characteristics of the real schematic, such as current nodes or equipotentials.

To this end, the invention provides a process for initializing and updating the topology of a high-voltage or medium-voltage electrical power station, the process being intended to optimize the operation of a digital protection system for protecting sets of busbars in the power station and using a basic schematic of the electrical configuration of the power station obtained from information on the type of components used in the power station, and on the possible connections and accesses to said components, said information being provided by an operator from a man-machine interface and assigned to management units of said digital protection system, said management units comprising peripheral measurement units distributed over the power station and at least one centralization unit, the process including the following steps:

a topological compilation process is implemented to provide a compiled schematic topology from the basic schematic, and to provide a compiled assignment topology of the components in the power station and of their connections to said management units;

a partial graph is obtained for each peripheral measuring unit from the compiled schematic and assignment topologies and from information collected by said unit on the status of the components which are assigned to it, operational search processes being implemented to generate partial graphs whose structure depends on the type of information searched for and the status of each component of the power station; and a complete graph is computed in one or more centralization units by algorithms which superpose partial graphs in accordance with graph theory.

The types of information searched for in order to create the graphs characterizing the network are mainly:
the current nodes of the electrical circuit provided in the power station,
the equipotentials,
the connected zones,
the circuit-breakers adjacent any point of the circuit, and
the status of the circuit as seen from any such component.

This information enables a fault in a set of busbars to be located immediately, the failure of a component of the network to be detected, the optimum tripping solutions to be found, the sensitivity of a set of busbars to be improved, dead zone faults to be detected automatically, or certain commands to be authorized or inhibited in particular circumstances (for example opening or closing a disconnector).

To assist with understanding what follows, it is necessary to define more precisely the types of information previously mentioned. See FIGS. 2 to 6 for an illustration of graphs generated from the basic schematic of a simple circuit shown in FIG. 1 for each type of information searched for. The current nodes of a conventional circuit of a power station are determined by the status of the circuit-breakers, disconnectors and current transformers of that power station. A node is a set of contiguous connections and closing a component of the circuit creates between the poles of that component a connection which merges at least two nodes connected to those poles into a single node. Using the graph of current nodes established by the method according to the invention, the operational search algorithm determines all the contiguous relationships between the various connections of the circuit and establishes a connection each time that a circuit-breaker or a disconnector is closed or is in an unknown state. A connection is also established as soon as a current transformer fails: because the measurement is assumed to be incorrect by default, it is necessary to measure the current flowing through the transformer from the sum of the currents measured by the adjacent transformers. Conversely, the circuit at the level of a component is open if a circuit-breaker or a disconnector is open, for example, or if a current transformer is operating correctly, because the measurement makes it possible to isolate the node. The resulting graph identifies the content of each of the independent nodes that define the current nodes of the circuit.

The equipotentials are determined only by the status of the circuit-breakers and the disconnectors, as the current transformers are all considered to be closed, regardless of their physical status. In the graph of equipotentials generated when updating the topology of the power station, an operational search algorithm determines all the contiguous relationships between the various connections of the circuit, establishing a connection each time that a circuit-breaker or a disconnector is closed. The resulting graph identifies the content of each of its independent nodes and therefore determines the equipotentials.

A zone of a power station corresponding generally to a busbar or a set of busbars of the power station. The zones referred to as connected zones are in fact the equipotentials between zones. The operational search process used by the system determines the zones that are attached to the same equipotential node.

The circuit-breakers referred to as adjacent are determined exclusively by the status of the circuit-breakers and the disconnectors of the circuit. To obtain the graph of adjacent circuit-breakers, the operational search process determines all the contiguous relationships between the various connections of the circuit and establishes a connection each time that a disconnector is closed or is in an indeterminate state or a closed circuit-breaker has failed. All the circuit-breakers that are closed and serviceable are considered to be open circuits, on exactly the same terms as the circuit-breakers that are open. This may seem illogical, but it is justified by the fact that the resulting graph identifies the serviceable circuit-breakers at each of its independent nodes and therefore determines the adjacent circuit-breakers for a given point of the circuit (any point of the circuit belonging to an independent node).

Defining the status of the circuit as seen from any component entails considering the component in question as an open circuit. Depending on the type of search effected, the circuits are considered open or closed according to their status, whether they are disconnectors, circuit-breakers, current transformers or any other component.

BRIEF DESCRIPTION OF THE DRAWINGS

The invention, its features and its advantages are explained in the following description, which is given with reference to the following figures.

MORE DETAILED DESCRIPTION

Figure 1:
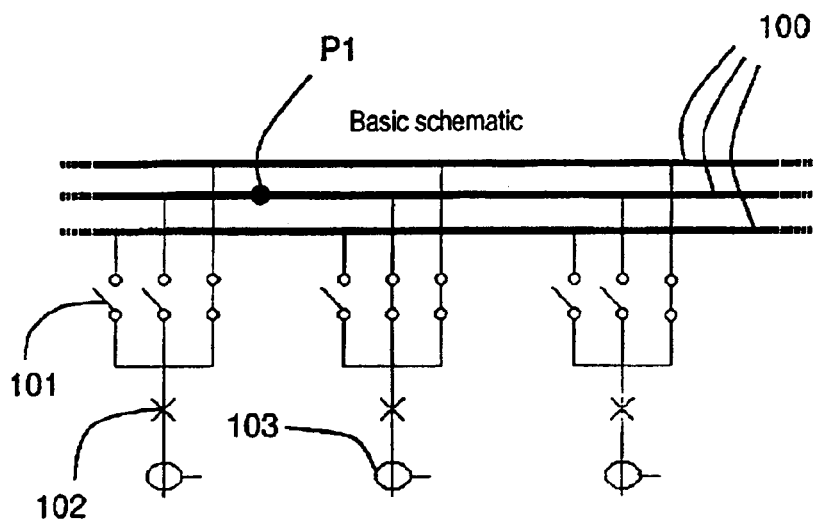
FIG. 1 shows a basic schematic of one example of an electrical circuit of a power station including three sets of busbars.

FIG. 1 shows the basic schematic of one example of an electrical circuit of a power station with three sets of busbars 100. In other words, the power station defines three zones as shown in FIG. 7. The power station includes nine disconnectors 101, three circuit-breakers 102 and three current transformers 103. Five disconnectors and one circuit-breaker are open. The point P1 represents any point of the circuit, and serves as a reference for the adjacent circuit-breakers graph in FIG. 6.

Figure 2:
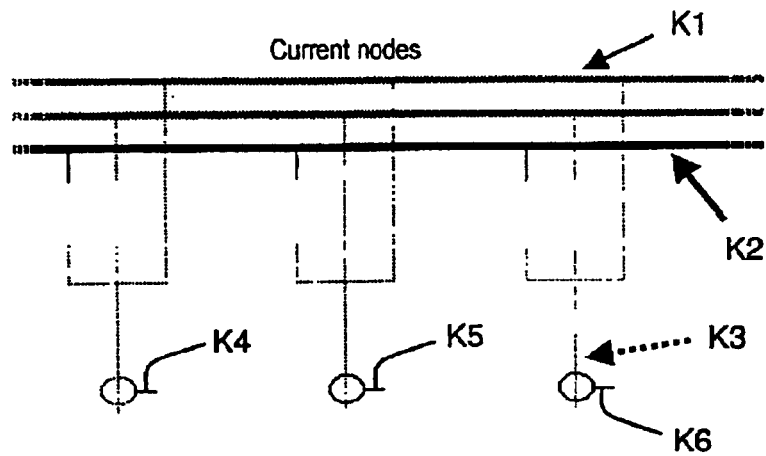
FIG. 2 shows a graph of current nodes of the circuit defined in FIG. 1.

In FIG. 2, the graph of the current nodes of the circuit includes six nodes K1 to K6. The nodes K4 to K6 are the secondary windings of the current transformers. The node K3 is a conductor isolated from the remainder of the circuit by an open circuit-breaker. The node K1 is the most extensive because it includes two sets of busbars that are interconnected.

Figure 3:
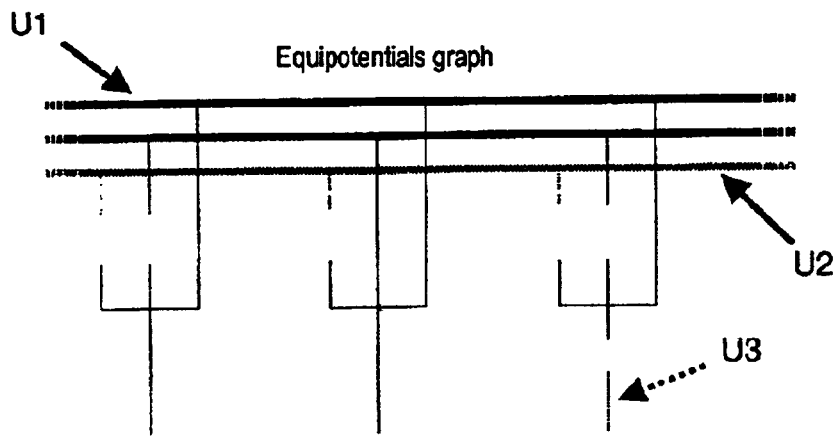
FIG. 3 shows a graph of equipotentials of the circuit defined in FIG. 1.

In FIG. 3, the equipotentials graph includes three equipotentials U1, U2 and U3 that correspond to the nodes K1 to K3 in FIG. 2. It must be borne in mind that only the status of the circuit-breakers and disconnectors is taken into account to determine the equipotentials.

Figure 4:
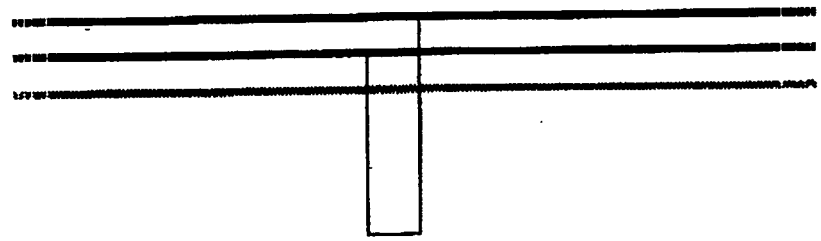
FIG. 4 shows a graph of connected zones of the circuit defined in FIG. 1.

In FIG. 4, the graph of connected zones shows the equipotentials between zones of sets of busbars.

Figure 5:
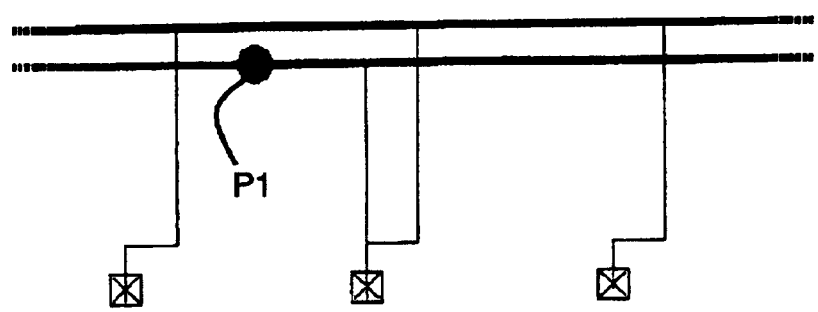
FIG. 5 shows a graph of adjacent circuit-breakers of a point in the circuit defined in FIG. 1.

In FIG. 5, the graph shows all the circuit-breakers connected to a point P1 of the circuit.

Figure 6:
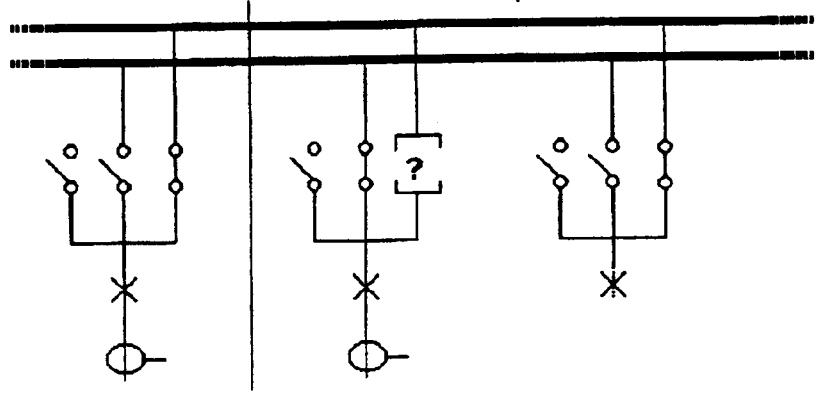
FIG. 6 shows a graph of the circuit defined in FIG. 1 as seen from a component.
Figure 7:
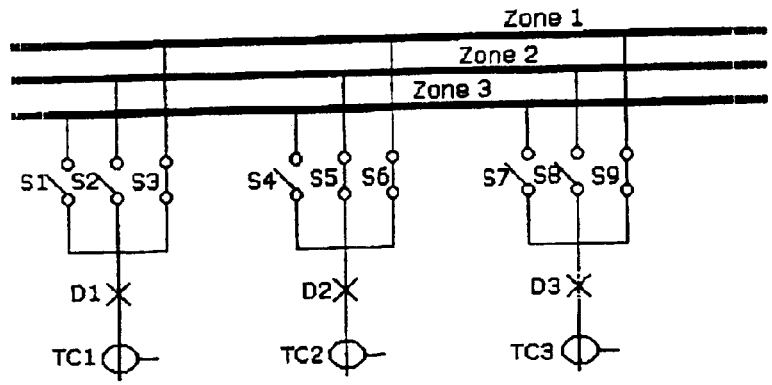
FIG. 7 shows the basic schematic already shown in FIG. 1, now with numbers for the components of the power station.

In FIG. 6, the graph shows all of the circuit connected to a component.

In FIG. 7, all of the components of the circuit are shown and numbered. The following list of components is therefore obtained: {zone 1, zone 2, zone 3, S1, S2, S3, S4, S5, S6, S7, S8, S9, D1, D2, D3, TC1, TC2, TC3}. Each zone represents a set of busbars. The disconnectors are denoted $S_{i=1 \ldots 9}$, the circuit-breakers are denoted $D_{i=1 \ldots 3}$ and the current transformers are denoted $TC_{i=1 \ldots 3}$.

Note that all these objects have two ports, except for the zones, which have a variable number of ports. The status of the components is of no importance at this level of analysis. Whether a disconnector is open or closed does not contribute any additional information. In the man-machine interface (MMI) part of the system, the schematic represents the components in a standard way, i.e. without allowing for their status. In what follows, the components of the circuit are referred to as objects of the basic schematic.

Figure 8:
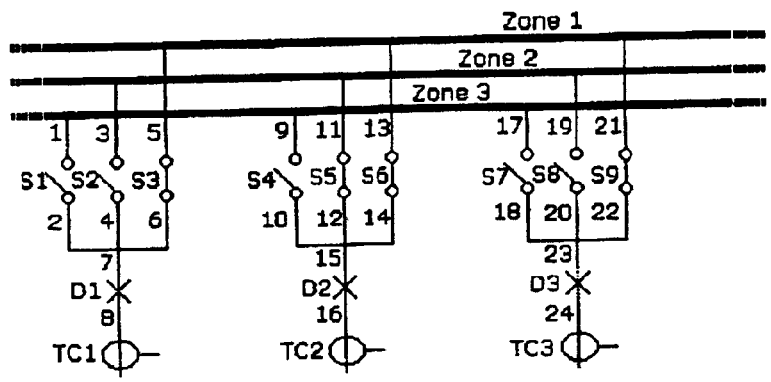
FIG. 8 is identical to FIG. 7 with additional, temporary numbers for all the connections of objects in the basic schematic.

In FIG. 8, all the connections between objects of the basic schematic are numbered temporarily. This produces 24 temporary connections.

Figure 9:
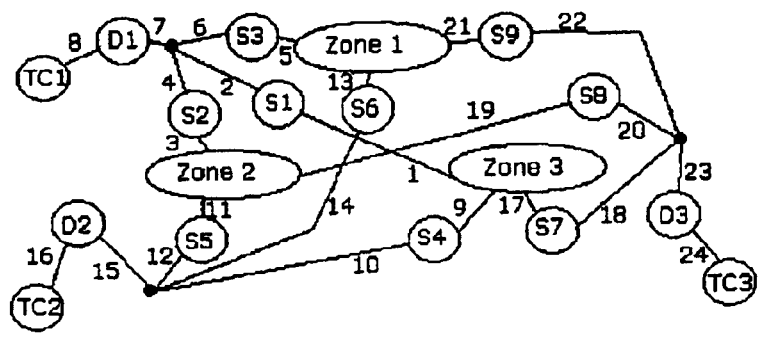
FIG. 9 shows in the form of a graph the basic schematic with the connections numbered.

In FIG. 9, the basic schematic is represented in the form of a graph with the connections numbered.

Figure 10:
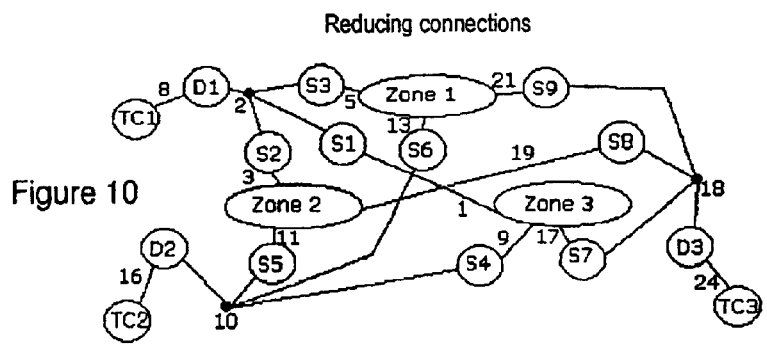
FIG. 10 shows the graph of the reduction to nodes of the connections of the objects of the basic schematic.

In FIG. 10, the reduction of the connections to nodes entails numbering all contiguous connections with the same number. The convention adopted in this example consists of assigning each node the lowest connection number.

Figure 11:
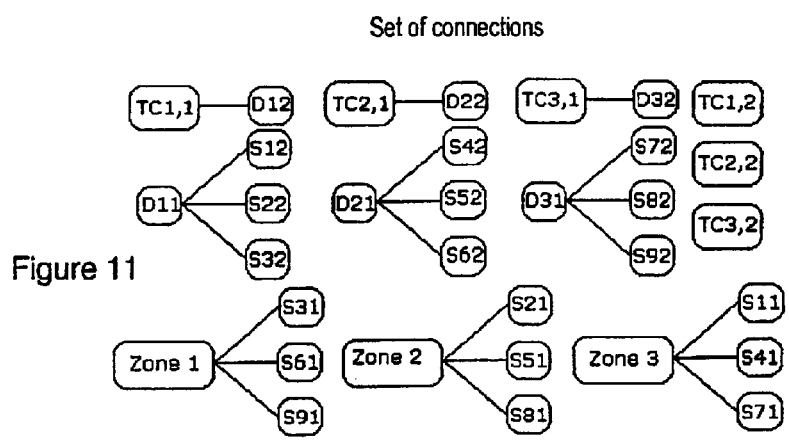
FIG. 11 shows the graph of all the connections between terminal components representing ports of the objects.

In FIG. 11, the ports of the objects are identified and represented by terminal components to form a reduced connections graph, each connection representing a connection between two ports. Apart from the zones, each object has two ports and is therefore divided into two terminal components. The numbered nodes in the FIG. 10 graph are not relevant to the remainder of the process, because they merely have a federating role for the connections. It is therefore no longer necessary to preserve the numbering of the nodes in the reduced connections graph. At this stage of the process, it is possible to describe the basic schematic by subsets of terminal components that are interconnected, each subset being represented by pairs of (round) brackets containing the components connected by the connections of the graph.

The following topology is therefore obtained for the graph:
(TC11,D12) (TC21,D22) (TC31,D32) (TC12) (TC22) (TC32) (D11,S12,S22,S32) (D21,S42,S52,S62) (D31, S72,S82,S92) (Zone 1,S31,S61,S91) (Zone 2,S21,S51, S81) (Zone 3,S11,S41,S71)

The set described therefore represents all the connections between terminal components. Note that, by definition, each of these subsets represents a node of the basic schematic, since all the connections between components of the same subset are contiguous.

Figure 12:
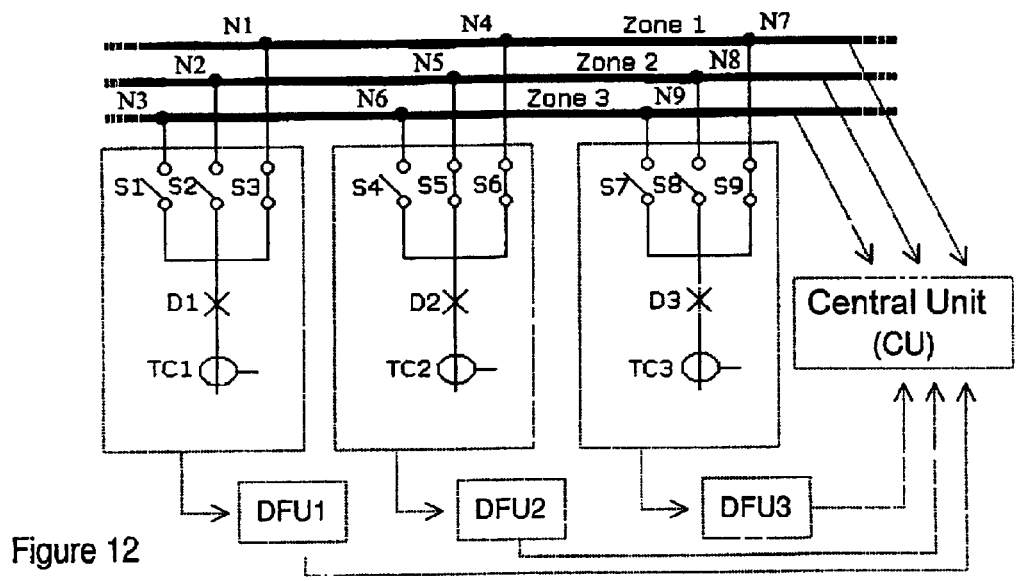
FIG. 12 is a diagram showing a distribution of the components of the power station for each measuring unit or centralization unit of the digital protection system.
Figure 13:
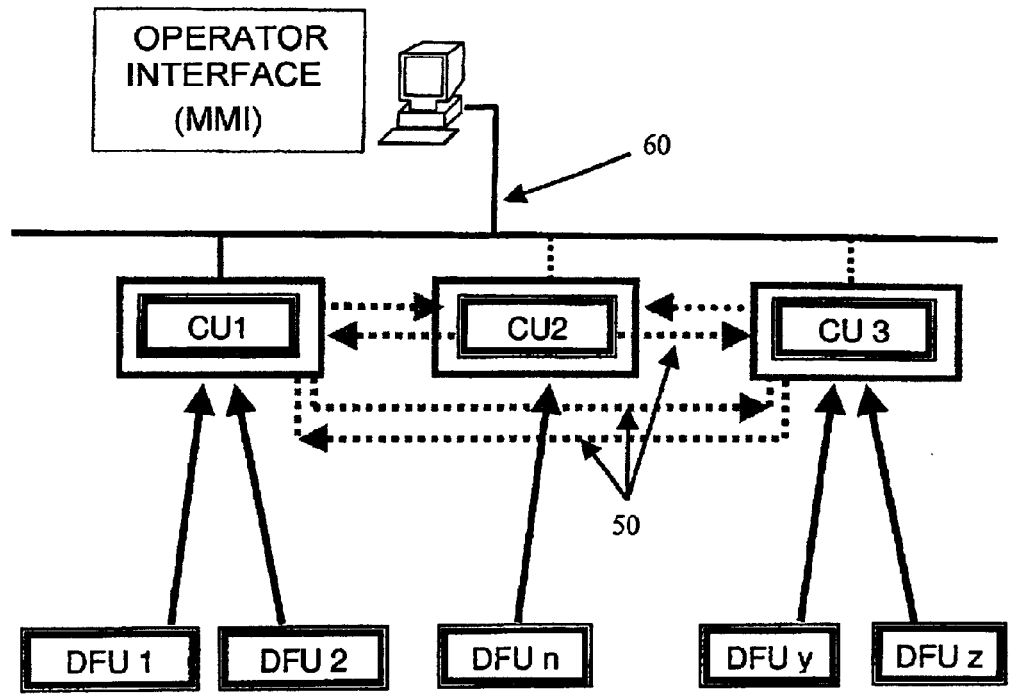
FIG. 13 is a diagram showing a topology for communication between the units of the system.

FIG. 12 is a diagram showing one example of the distribution of the components of the power station by management units of the protection system consisting of peripheral measuring units designated by the abbreviation DFU for "Distant Feeder Unit", or centralization units designated by the abbreviation CU for "Central Unit". FIG. 13 shows the architecture of these units in detail. It is the responsibility of an operator to assign each group of components to a management unit of the protection system, which does not pose any particular problem given that a peripheral measuring unit is generally installed near each separate group.

By default, the zones are assigned to one or more centralization units (CU) which have a federating role. Assuming that there are three measuring units DFU1, DFU2 and DFU3, it is logical to assign the components S1,S2,S3,D1 and TC1 to unit DFU1, similarly to assign the components S4,S5,S6,D2 and TC2 to unit DFU2, and finally to assign the components S7,S8,S9,D3 and TC3 to unit DFU3. All the components, and therefore all the terminal components, are therefore assigned. The tasks of each measuring unit can then be distributed.

Each DFU can process all the terminal components concerning it, i.e. all the connections concerning the components which are assigned to it. Those connections are as follows:

For DFU1: (TC11, D12) (TC12) (D11, S12, S22, S32) (Zone 1, S31, S61, S91) (Zone 2, S21, S51,S81) (Zone 3, S11, S41, S71)

For DFU2: (TC21, D22) (TC22) (D21, S42, S52, S62) (Zone 1, S31, S61, S91) (Zone 2, S21, S51, S81) (Zone 3, S11, S41, S71)

For DFU3: (TC31, D32) (TC32) (D31, S72, S82, S92) (Zone 1, S31, S61, S91) (Zone 2, S21, S51, S81) (Zone 3, S11, S41, S71)

For the CU:

(Zone 1, S31, S61, S91) (Zone 2, S21, S51, S81) (Zone 3, S11, S41, S71)

Because each DFU is autonomous, it cannot process a terminal component that represents the port of a component that has not been assigned to that unit. A DFU therefore identifies a node as external each time that the subset representing that node includes a terminal component of an object that has not been assigned to that DFU. The external nodes can be processed only by a federating unit, i.e. a central unit CU, which alone is capable of synthesizing them. Conversely, if a subset representing a node includes only terminal components of objects that have all been assigned to the same DFU, then that node is identified as internal by the DFU.

In the example under discussion, because TC1, D1, S1, S2 and S3 are all assigned to DFU1, the internal nodes for DFU1 are therefore:

(TC11, D12) (TC12) (D11, S12, S22, S32).

The external nodes of DFU1 are:

(Zone 1, S31, S61, S91) (Zone 2, S21, S51, S81) (Zone 3, S11, S41, S71)

Thus there are three external nodes for DFU1, represented in the figure by the set of contiguous connections at the local nodes N1, N2 and N3, respectively. These three nodes are identified at the level of the units CU and DFU1. The same step of identifying internal and external nodes is effected for the units DFU2 and DFU3. In the figure, the local nodes N4, N5 and N6 represent the three external nodes of DFU2 and N7, N8 and N9 represent the three external nodes of DFU3. The external nodes for DFU2 are:

(Zone 1, S61, S31, S91) (Zone 2, S51, S21, S81) (Zone 3, S41, S11, S71).

The external nodes for DFU3 are:

(Zone 1, S91, S61, S31) (Zone 2, S81, S51, S21) (Zone 3, S71, S41, S11).

The next step amounts to constituting new external nodes for each DFU, also referred to as reduced external nodes, which are purged of objects unknown to the DFU and replace the external nodes previously defined.

For DFU1, the external node represented by N1 is purged of the elements S61 and S91 and the zone 1, which are not assigned to DFU1. There remains only S31 assigned to DFU1 for this external node represented by N1. The same process is applied to the nodes represented by N2 and N3, and the following reduced external nodes are then obtained for DFU1: (S31, N1), (S21, N2) and (S11, N3). The same operation is effected for all the DFU.

Finally, the following compiled topology is obtained for all the basic nodes, i.e. all reduced external nodes and internal nodes of the DFU:

For DFU1:
The internal nodes are (TC11, D12) (TC12) (D11, S12, S22, S32) and the reduced external nodes are (S31, N1) (S21, N2) (S11, N3)

For DFU2:
The internal nodes are (TC21, D22) (TC22) (D21, S42, S52, S62) and the reduced external nodes are (S61, N4) (S51, N5) (S41, N6)

For DFU3:
The internal nodes are (TC31, D32) (TC32) (D31, S72, S82, S92) and the reduced external nodes are (S91, N7) (S81, N8) (S71, N9).

The following nodes are assigned to the centralization unit (CU) from the external nodes of the DFU purged of the elements assigned to those DFU:
(Zone 1, N1, N4, N7) (Zone 2, N2, N5, N8) (Zone 3, N3, N6, N9).

The compiled assignment topology is then complete.

Thus a DFU does not need to know any objects apart from those which are assigned to it. The various peripheral units DFU therefore have no need to exchange data of connections between them, that data being generated at the level of the nodes assigned to the central unit CU.

FIG. 13 is a diagram showing generalization of the communication topology referred to in the preceding example between the measuring units and centralization units of the system. A plurality of centralization units (CU1, CU2, CU3) is shown, and consists of digital processor units comprising topological compilation modules and operational search algorithm modules. The centralization units are interconnected by a dedicated communication network 50 independent of the remainder of the system and in particular of the communication network 60 which is connected to at least one centralization unit (CU) and to a computer providing the operator interface (MMI) function. The operator interface transmits information entered by the operator to the management units of the protection system (DFU, CU) and also recovers information from the set of busbars from the units (DFU, CU) in order to display it on a mimic diagram. The peripheral measuring units (DFU) are connected to the centralization units independently of each other.

Once the assignment topology has been completed, the measurement and centralization units share the tasks to perform an operational search process intended to exploit the compiled schematic and assignment topology to generate graphs whose structure depends on the function defined by the type of information searched for (current nodes, equipotentials, etc.) and the status of each component of the network (open, closed, indeterminate, etc.). For the purposes of this operational search, each measuring unit (DFU) has the task of computing its own partial graph for the function searched for, in particular based on information collected by the unit on the status of the components that are assigned to it. Each centralization unit (CU) then has the task of computing the resultant graph for partial graphs supplied by each DFU that the CU manages. Finally, the various CU cooperate with each other to compute the complete graph for the required function over the whole of the basic schematic.

Each DFU receives information on the status of the components that it manages, enabling new nodes to be assigned to the DFU in addition to the internal nodes and the reduced external nodes resulting from the schematic and assignment topology obtained by the topological compilation process. This operational search step is illustrated by the following example, relating to the equipotential function:

To search for equipotentials, the following status rules must be considered for the components of the circuit:

A current transformer creates an equipotential connection between its two ports regardless of its status, and therefore always closes an equipotential graph. A DFU then creates the nodes (TCx1, TCx2) as soon as it is assigned a current transformer TCx.

A disconnector or a circuit-breaker closes an equipotential graph if it is closed and opens it if it is open or its status is unknown. A new node (Sx1, Sx2) or (Dx1, Dx2) is therefore created by a DFU as soon as the ports of the same disconnector Sx or circuit-breaker Dx object assigned to that DFU are interconnected.

Returning to the example of assignment topological compilation illustrated by the FIG. 12 diagram, the following new nodes can be created from what has gone before:
(TC11, TC12) (TC21, TC22) (TC31, TC32) (S31, S32) (S51, S52) (S61, S62) (S91, S92) (D11, D12) (D21, D22). These new nodes are also called status connections in the sense that they represent the connection between the ports of an object as a function of the status of the component that the object represents.

The compiled schematic and assignment topology obtained previously identifies the internal and external nodes of each DFU, which can now be completed by the status connections. For DFU1, as already indicated, the internal nodes are (TC11, D12) (TC12) (D11, S12, S22, S32) and the external nodes are (S31, N1) (S21, N2) (S11, N3). The status connections are then selected that correspond to objects assigned to DFU1, i.e. (TC11, TC12) (S31, S32) (D11, D12), to obtain the partial graph of the set of nodes managed by DFU1.

Similarly, the following partial graph of the set of nodes is obtained for DFU2:
(TC21, D22) (TC22) (D21, S42, S52, S62) (S61, N4) (S51, N5) (S41, N6) (TC21, TC22) (S51, S52) (S61, S62) (D21, D22)

Similarly, for DFU3:
(TC31, D32) (TC32) (D31, S72, S82, S92) (S91, N7) (S81, N8) (S71, N9) (TC31, TC32) (S91, S92).

For the CU, as already indicated, only the external nodes and the zones are managed during the assignment topological process. The previous nodes are therefore taken up again:
(Zone 1, N1, N4, N7) (Zone 2, N2, N5, N8) (Zone 3, N3, N6, N9).

Each peripheral unit DFU can now effect a node reduction step in the partial graph that it manages by comparing the nodes with each other. Each node of a partial graph is thus compared to the other nodes of that graph one by one in order to determine if two nodes have a common terminal component. If so, this means that the two nodes are directly interconnected and can therefore be reduced to a single node by pooling their terminal components. The reduced node obtained is compared to the other nodes of the graph, which can again lead to the reduction of two nodes to a single node, and so on. Note that node reduction can be modeled mathematically by applying a succession of AND logic operators between the subsets representing the nodes and applying an OR logic operator between the subsets for which the AND logic operator has given a non-null result. At the level of the partial graph, this step finally consists of grouping a plurality of interconnected local nodes to form a larger node.

For DFU1, for example, (TC11, D12) AND (TC11, TC12)=(TC11, D12, TC12), which can be grouped with (TC12) and (D11, D12) to give (TC11, D12, TC12, D11). Note also that (D11, S12, S22, S32) AND (S31, S32) AND (S31, N1) give (D11, S12, S22, S32, S31, N1) which shares the component D11 with the preceding intermediate node, so that it is possible to create the larger node (TC11, D12, TC12, D11, S12, S22, S32, S31, N1). The nodes (S21, N2) and (S11, N3) cannot be grouped with another node.

Reduction therefore gives for DFU1 the following reduced partial graph:
(TC11, D12, TC12, D11, S12, S22, S32, S31, N1) (S21, N2) (S11, N3).

Similarly, for DFU2:
(TC21, D22, TC22, D21, S42, S51, S52, S62, S61, N4, N5) (S41, N6),
and for DFU3:
(TC31, D32, TC32) (D31, S72, S82, S92, S91, N7) (S81, N8) (S71, N9).

This information is transmitted by the DFU to the centralization unit (CU) which manages the DFU. It is assumed here that it is the same CU for all three DFU, but the operating principle is the same if more than one CU manage the DFU, because in this case the various CU communicate with each other via a communication network like that shown in FIG. 13.

Thus the CU can process all of the nodes of the following complete graph:
(Zone 1, N1, N4, N7) (Zone 2, N2, N5, N8) (Zone 3, N3, N6, N9) (TC11, D12, TC12, D11, S12, S22, S32, S31, N1) (S21, N2) (S11, N3) (TC21, D22, TC22, D21, S42, S51, S52, S62, S61, N4, N5) (S41, N6) (TC31, D32, TC32) (D31, S72, S82, S92, S91, N7) (S81, N8) (S71, N9).

The set of nodes can be reduced using the same grouping methods as for the nodes of the partial graphs, to obtain:
(Zone 1, Zone 2, N1, N4, N7, N2, N5, N8, TC11, TC12, D11, D12, S12, S21, S22, S31, S32, S72, S81, S82, S91, S92, TC21, TC22, D21, D22, S42, S51, S52, S61, S62, D31) (Zone 3, N3, N6, N9, S11, S71, S41) (TC31, D32, TC32)

The representations N1 to N9 of the external nodes are no longer of any use at this stage for representing the complete graph of the three equipotentials corresponding to the three reduced nodes obtained. These nodes N1 to N9 can therefore be eliminated to simplify the subsets of components forming the three separate equipotentials. It can be verified that the complete graph obtained corresponds well to the FIG. 3 illustration for the same example for which the three equipotentials U1, U2 and U3 are sketched in.

The equipotential graph in particular ensures that a disconnector can be closed under load, provided that the terminal components representing the two ports of that disconnector belong to the same equipotential node.

For example, S8 or S2 can be closed, but not S1 or S7 or S4.

To find out if a disconnector can be opened, the same type of operational search process is applied, but the disconnector that it is required to open is considered to be open, since it is necessary to find out if both ports of the disconnector will be at the same potential once it is opened. In the example under discussion, S3, S5, S6 and S9 can opened. The equipotentials also provide the zone group information. In the example under discussion there are two groups, (Zone 1, Zone 2) and (Zone 3).

To improve very significantly the speed of the operational search process used to implement the invention, the assignment topology is followed by pre-formatting of assignment information entered in topology binary files at each DFU. Those files use strings of one or more bytes. Each bit of a byte represents the port of a component identified at the time of assignment, or can represent an external node assigned to a measuring unit of the system (such as the nodes N1 to N9 in the example previously discussed).

Figure 14:
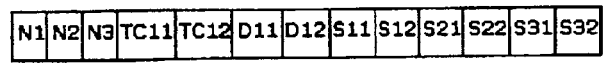
FIG. 14 is a diagram showing a string of two bytes in which each bit represents a port of a component identified at the time of assignment.

FIG. 14 shows this kind of pre-formatted file, which consists of thirteen bits (the file therefore requires two bytes), and in which all the bits represent the terminal components assigned to DFU1 and all the external nodes of DFU1. Thus all the basic nodes (internal nodes and reduced external nodes) of the partial graph managed by DFU1 can be described by the following binary files, setting each bit to logic 1 if the port that the bit represents is a port of the node:

| | |
|---|---|
| (TC11, D12) = | 0001001000000 |
| (TC12) = | 0000100000000 |
| (D11, S12, S22, S32) = | 0000010010101 |
| (S31, N1) = | 1000000000010 |
| (S21, N2) = | 0100000001000 |
| (S11, N3) = | 0010000100000 |

To find out if two nodes are directly interconnected, the operational search algorithm simply applies the AND logic operator to the files to search for any binary coincidence. If the result is a null result, there is no connection. Otherwise there are one or more connections (as many as there are common binary positions at 1), and the nodes can then be grouped by applying the OR logic operator to the nodes.

Note that each of the basic nodes of the partial graph is independent of the others, i.e. that there is no logic 1 common to the same position between the files describing all the nodes of the graph. This is perfectly normal, since the basic nodes have already been grouped, i.e. reduced as much as possible, during the topological compilation process.

The operational search algorithm then requires the description in the form of binary files of the status connections, which are as follows for DFU1:

| | |
|---|---|
| (TC11, TC12) = | 0001100000000 |
| (S31, S32) = | 0000000000011 |
| (D11, D12) = | 0000011000000 |

All the nodes of the partial graph can then be reduced by searching, from each status connection, the possible groupings with the basic nodes of the graph. The first status connection (TC11, TC12) gives a non-null result when the AND logic operator is applied to it and the basic nodes (TC11, D12) and (TC12) of the graph, and gives a null result with the other basic nodes.

Indeed:

| | |
|---|---|
| (TC11, D12) = | 0001001000000 |
| and (TC11, TC12) = | 0001100000000 |
| Similarly, (TC12) = | 0000100000000 |
| and (TC11, TC12) = | 0001100000000 |

The search process then groups the preceding nodes using an OR logic operator:
(TC11, D12) OR (TC11, TC12)=(TC11, TC12, D12)= 0001101000000,
and (TC12) OR (TC11, TC12)=(TC11, TC12)= 0001100000000.

The two nodes obtained can then be grouped because they share the ports of the status connection on which the search is effected. The process finally retains only the global node (TC11, TC12, D12) for the first status connection. A new search is then effected for each remaining status connection, and all the global nodes obtained are then grouped to obtain the irreducible node (TC11, D12, TC12, D11, S12, S22, S32, S31, N1) of the partial graph of DFU1. Also, the operational search process has established that all the status connections give a null result on applying the AND logic operator to the basic nodes (S21, N2) and (S11, N3), which are therefore irreducible nodes of the partial graph of DFU1. The reduced partial graph of DFU1 is therefore:
(TC11, D12, TC12, D11, S12, S22, S32, S31, N1) (S21, N2) (S11, N3).

To speed up the operational search algorithm, it may be deemed not indispensable to apply the AND logic operator to each status connection and the basic nodes of a partial graph for a DFU. It is possible to use for each DFU a graph referred to as the "flow" graph of that DFU, established on the basis of the basic schematic of components entered via the operator interface, i.e. without taking into account the status of the objects.

Figure 15:
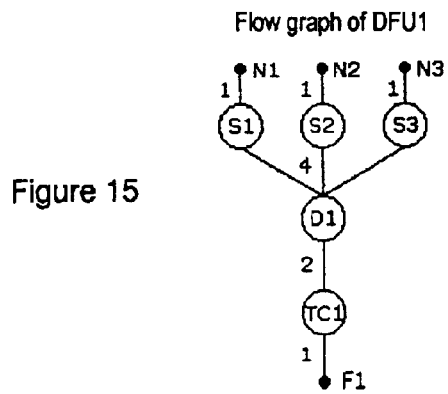
FIG. 15 is a diagrammatic flow graph of the measuring unit DFU1 shown in FIG. 12.

FIG. 15 shows the flow graph for DFU1. Note, for example, that the current transformer TC1 can connect only the node F1 and the circuit-breaker D1 (via its port D12). It is therefore useless to look for the flow of the status connection (TC11, TC12) on basic nodes other than those of the partial graph of DFU1 that contain the port D12 or the node F1. Using information from the flow graph, operations can finally be conducted in a predefined optimum order to limit redundancies and to enable each intermediate result to lead either to isolating a basic node or to grouping nodes by way of a status connection.

To define the optimum order, the operational search algorithm uses the flow value of each connection between the objects, which is an integer value representing the number of ports of the connection to a status connection. In the FIG. 15 example, a connection between a node (N1, N2 or N3) and a disconnector has only one port to a status connection, in this instance a connection (Sx1, Sx2). The flow value of each of the three connections is therefore equal to 1, as shown. Note that a node (N1, N2, N3 or F1) does not represent any status connection because it is systematically connected to a zone of the complete graph or to a zone external to the graph. A connection between a disconnector (S1, S2, S3) and the circuit-breaker (D1) has four ports to a status connection, because it is connected to these four objects (S1, S2, S3, D1), each of which can create a connection as a function of its status. For example, a disconnector Sx authorizes a status connection Sx1 or Sx2 because it can be open or closed. The same reasoning is applied for the other connections of the flow graph, to obtain the values indicated in the figure.

The maximum number of operations to be carried out is then computed by reducing each flow value by one unit and summing the values obtained. The values of flow therefore enable the operational search algorithm to define the number of comparisons and groupings of nodes to be performed.

What is claimed is:

1. A process for initializing and updating the topology of a high-voltage or medium-voltage electrical power station, the process being intended to optimize the operation of a digital protection system for protecting sets of busbars in the power station and using a basic schematic of the electrical configuration of the power station obtained from information on the type of components used in the power station, and on the possible connections and accesses to said components, said information being provided by an operator from a man-machine interface and assigned to management units of said digital protection system, said management units comprising peripheral measurement units distributed over the power station and at least one centralization unit, the process including the following steps:

a topological compilation process is implemented to provide a compiled schematic topology from the basic schematic, and to provide a compiled assignment topology of the components in the power station and of their connections to said management units;

a partial graph is obtained for each peripheral measuring unit from the compiled schematic and assignment topologies and from information collected by said unit on the status of the components which are assigned to it, operational search processes being implemented to generate partial graphs whose structure depends on the type of information searched for and the status of each component of the power station; and a complete graph is computed in one or more centralization units by algorithms which superpose partial graphs in accordance with graph theory.

2. A schematic topological compilation and assignment topological compilation process used to implement the topology updating process according to claim 1, the process including the following steps:

provisionally numbering all the connections of the basic schematic, reducing to nodes connections between numbered objects representing the components of the network, by renumbering with the same number all the contiguous connections between objects, splitting each object into as many terminal components as there are possible ports for the component that it represents, constituting all the connections between objects by establishing the list of all their terminal components in the form of a reduced connections graph, dividing the list of terminal components into subsets each consisting of interconnected terminal components, assigning each subset of terminal components to a management unit as soon as at least one terminal component of said subset represents a connection concerning a component managed by that unit, identifying subsets of terminal components assigned to each peripheral measuring unit as internal nodes or external nodes of said unit, a subset being defined as an internal node if all its terminal components are managed by the unit and as external node if at least one terminal component concerns a component that has not been assigned to the unit, for each peripheral measuring unit, constituting reduced external nodes that are purged of objects unknown to the unit and replace the old external nodes identified in the preceding step, and identifying the nodes processed by a centralization unit of the protection system.

3. An operational search process used for implementing the topology updating process according to claim 1, wherein the searching process uses information collected by a peripheral measuring unit on the status of the components which are assigned to it to arrive at a topology in the form of node(s) or in the open graph form between the ports of each object, and wherein a plurality of nodes interconnected in a partial graph are grouped into a single node during a step of node reduction by mutual comparison.

4. An operational search process according to claim 3, wherein the assignment information belonging to the peripheral measuring units is formatted as topology binary files which use strings of one or more bytes, and wherein each bit of a byte represents the port of a component which is identified at the time of the assignment or represents an external node assigned to a said unit.

5. An operational search process according to claim 4, wherein a node of a partial group is described by a binary file in which each bit goes to logic 1 if the port that the bit represents is a port of the node.

6. An operational search process according to claim 5, wherein the nodes of a partial graph are reduced on the basis of binary files describing the basic nodes and the status connections of the graph by applying the AND and OR logic operators to the binary files.

7. An operational search process according to claim 6, wherein a flow graph of the part of the basic schematic assigned to a peripheral measuring unit is established from the distributed basic schematic entered by an operator, and wherein said flow graph is processed by said unit to optimize the number of logic operations that it must perform on the binary files for the node reduction steps.

8. A process for initializing and updating the topology of an electrical power station to optimize a digital protection system for busbar sets in the power station and using an electrical configuration schematic of the power station that comprises component types and possible connections and accesses thereto, wherein the electrical configuration schematic is assigned to a management unit of the digital protection system, and the management unit comprises peripheral measurement units distributed over the power station and at least one centralization unit, wherein the method comprises:

compiling a schematic topology from the electrical configuration schematic and an assignment topology of the components in the power station and their connections to the management unit;

creating a partial graph for each peripheral measuring unit from the compiled schematic topology, the compiled assignment topology and from information collected by the peripheral measuring unit from the components which are assigned to it, wherein an operational search process generates a partial graph dependent upon a type of information searched for and a status of each component of the power station; and computing a complete graph by superposing the partial graphs in accordance with graph theory.

9. The process according to claim 8, wherein a schematic topological compilation and assignment topological compilation process comprises:

provisionally numbering all the connections of the electrical configuration, reducing to nodes connections between numbered objects representing the components of the network by renumbering with the same number all the contiguous connections between objects, splitting each object into as many terminal components as there are possible ports for the component that it represents, constituting all the connections between objects by establishing the list of all their terminal components in the form of a reduced connections graph, dividing the list of terminal components into subsets each consisting of interconnected terminal components, assigning each subset of terminal components to a management unit as soon as at least one terminal component of the subset represents a connection concerning a component managed by that unit, identifying subsets of terminal components assigned to each peripheral measuring unit as internal nodes or external nodes of the unit, a subset being defined as an internal node if all its terminal components are managed by the peripheral measuring unit and as external node if at least one terminal component concerns a component that has not been assigned to the peripheral measuring unit, for each peripheral measuring unit, constituting reduced external nodes that are purged of objects unknown to the peripheral measuring unit and replace the old external nodes identified in the preceding step, and identifying the nodes processed by the centralization unit.

10. The process according to claim 8, wherein the operational search process uses information collected by a peripheral measuring unit on the status of the components which are assigned to it to arrive at a topology in the form of node(s) or in the open graph form between the ports of each object, and wherein a plurality of nodes interconnected in a partial graph are grouped into a single node during a step of node reduction by mutual comparison.

11. The process according to claim 10, wherein the assignment information belonging to the peripheral measuring units is formatted as topology binary files that use strings of one or more bytes, and wherein each bit of a byte represents the port of a component that is identified at the time of the assignment or represents an external node assigned to the unit.

12. The process according to claim 11, wherein a node of a partial group is described by a binary file in which each bit goes to logic 1 if the port that the bit represents is a port of the node.

13. The process according to claim 12, wherein the nodes of a partial graph are reduced on the basis of binary files describing the basic nodes and the status connections of the graph by applying the AND and OR logic operators to the binary files.

14. The process according to claim 13, wherein a flow graph of the part of the basic schematic assigned to a peripheral measuring unit is established from the electrical configuration schematic, and wherein the flow graph is processed by the peripheral measuring unit to optimize the number of logic operations that it must perform on the binary files for the node reduction steps.

* * * * *